US006225718B1

(12) United States Patent
Kamei et al.

(10) Patent No.: US 6,225,718 B1
(45) Date of Patent: May 1, 2001

(54) STARTER

(75) Inventors: Koichiro Kamei; Shigeru Shiroyama; Akira Kuragaki; Hidekazu Katayama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,476

(22) Filed: Dec. 2, 1999

(30) Foreign Application Priority Data

May 27, 1999 (JP) ................................................ 11-148162

(51) Int. Cl.[7] ............................ H02K 5/10; H02K 11/00; H01R 39/38; H01R 39/36; F02N 11/08

(52) U.S. Cl. ................................ 310/87; 310/88; 310/71; 310/239; 310/249; 290/48

(58) Field of Search ................................. 310/85, 86, 87, 310/88, 89, 71, 67 R, 238, 239, 248, 249; 290/48, 38 A, 38 B

(56) References Cited

U.S. PATENT DOCUMENTS 5,065,039 * 11/1991 Isozumi et al. ........................ 290/48
5,877,575 * 3/1999 Nara et al. ........................... 310/239
6,157,105 * 12/2000 Kuragaki et al. .................. 310/75 R

FOREIGN PATENT DOCUMENTS 7-87682 9/1996 (JP) .
8-319926 12/1996 (JP) .
10-266933 10/1998 (JP) .

* cited by examiner

*Primary Examiner*—Nestor Ramirez
*Assistant Examiner*—Dane Dinh Le
(74) *Attorney, Agent, or Firm*—Sughrue, Mion, Zinn, Macpeak & Seas, PLLC

(57) ABSTRACT

To prevent powder caused by wear of brushes from entering a contact chamber, a first stationary contact is electrically connected to a battery and a second stationary contact is connected to positive brushes, wherein a contact bracket is provided to hold the first stationary contact, and a contact chamber cover is provided to interpose and hold the second stationary contact between the contact chamber cover and the contact bracket so that the contact chamber can be kept in an airtight state.

4 Claims, 15 Drawing Sheets

STARTER

BACKGROUND OF THE INVENTION

1. Field of the Invention

The present invention relates to a starter for starting an engine.

2. Description of the Prior Art

FIG. 14 is a sectional view showing one example of a conventional starter that was disclosed in Japanese Published Unexamined Patent Application No. 266933/1998.

In FIG. 14, 1A is an output shaft. An electromagnetic switch 2A, an over-running clutch 30A provided with a pinion 30P which meshes with a ring gear 50A, a plunger 40A comprising an inner plunger 4A and an outer plunger 4B are arranged on the same shaft as the output shaft 1A. A starter with this structure is generally called a coaxial type starter.

12A is an armature of a DC motor and 16A is a shaft (a motor shaft). 18A is a reduction mechanism which reduces the rotational force of the shaft 16A and transmits it to the output shaft 1A.

8A is a contact shaft supported by an inner gear 17A of the reduction mechanism 18A almost parallel with the plunger 40A through a supporting hole 17*m*.

100 is a bracket and 800 is a shift plate which connects the plunger outer 4B with the contact shaft 8A.

Further, the upper side from the center axis in FIG. 14 shows the state of a starter not in operation and the lower side shows the state wherein the starter is in operation with an electromagnetic switch turned ON and the pinion meshed with the ring gear.

Next, the operation of the starter is explained.

First, when an ignition switch is turned ON and current flows to an exciting coil 2B of the electromagnetic switch 2A, the outer plunger 4B is attracted by an exciting core 2C of the electromagnetic switch 2A. This conventional starter has such a structure that the outer plunger 4B is directly connected with the contact shaft 8A via the shift plate 800 and when the outer plunger 4B is attracted by the exciting coil 2B, the contact shaft 8A is also moved simultaneously. Between the outer plunger 4B and the inner plunger 4A, there is a coil spring 401 mounted on a spring bracket 400 and the inner plunger 4A is kept in the stationary state because the coil spring 401 deflects at the initial stage even when the outer plunger 4B is attracted and begins to move. In front of the inner plunger 4A, an inner clutch 30B is mounted via a shifter member 402 and as long as the inner plunger 4A is kept in the stationary state, the inner clutch 30B is also kept in the stationary state. After a short interval when the plunger 4B is attracted and begins to move, a movable contact 80A mounted on the contact shaft 8A comes into contact with a stationary contact 80B mounted in a contact chamber ZA. When the movable contact 80A is brought into contact with the stationary contact 80B, electric power is supplied from an external power source via a contact bolt 11A, and an armature 12A begins to turn. When the output shaft 1A begins to turn by way of the reduction mechanism 18A, the pinion 30P is caused to move toward the ring gear 50A by a thrust generated in a helical spline portion 1B, and the threads and the thread grooves of the pinion 30P and the ring gear 50A agree and mesh. Thereafter, when the engine starts, the output shaft 1A and the pinion 30P are separated by the action of the overrunning clutch 30A and the pinion 30P runs idle. When the power supply to the exciting coil 2B is stopped, the pinion 30P is disengaged from the ring gear 50A by return springs 403, 404.

However, in the case of a conventional starter disclosed in Japanese Published Unexamined Patent Application No. 266933/1998, there have been problems whereby a pigtail 42 (a lead wire) for electrical connection with a brush 43 is connected to the movable contact 80A and whenever the contacts 80A, 80B are opened/closed, a repetitive stress is applied to the pigtail 42. Also, worn powder from the brush 43 enters the contact chamber ZA because this chamber is not airtight.

Further, in the case of a conventional starter disclosed in Japanese Published Unexamined Patent Application No. 319926/1996 shown in FIG. 15, a contact chamber cover 45 is provided but a repetitive stress is applied to the pigtail 42 of the brush 43 similar to the case of the starter disclosed in Japanese Published Unexamined Patent Application No. 266933/1998 as the pigtail 42 is connected to the movable contact 80A. Further, in the conventional technology shown in this FIG. 15, the contact chamber ZA is covered by the contact chamber cover 45 but under this contact chamber cover 45, a space is formed for the movable contact 80A to move and the contact chamber ZA is not kept in an airtight state. Therefore, there has been a problem whereby worn powder from the brush enters the contact chamber ZA in the same manner as with the starter shown in FIG. 14.

SUMMARY OF THE INVENTION

The present invention was made to solve such problems as those mentioned above and its object is to provide a highly reliable starter with a structure wherein no repetitive stress is applied to the pigtail and worn powder from the brush can be prevented entering the contact chamber, thus preventing improper contact.

In the starter of the present invention comprising a first stationary contact that is electrically connected to a battery, a second stationary contact that is electrically connected to a positive brush, and a contact chamber where the electricity is sent between the first and second stationary contacts by a movable contact, a contact bracket is provided to hold the first stationary contact, and a contact chamber cover is provided to interpose and hold the second stationary contact between the contact chamber cover and the contact bracket so that the contact chamber can be kept in an airtight state.

The above and other objects, features and advantages of the present invention will become more apparent from the following description when taken in conjunction with the accompanying drawings.

DESCRIPTION OF THE PREFERRED EMBODIMENTS

[First Embodiment]

A first embodiment of a starter according to the present invention will be described below referring to the attached drawings.

Figure 1:
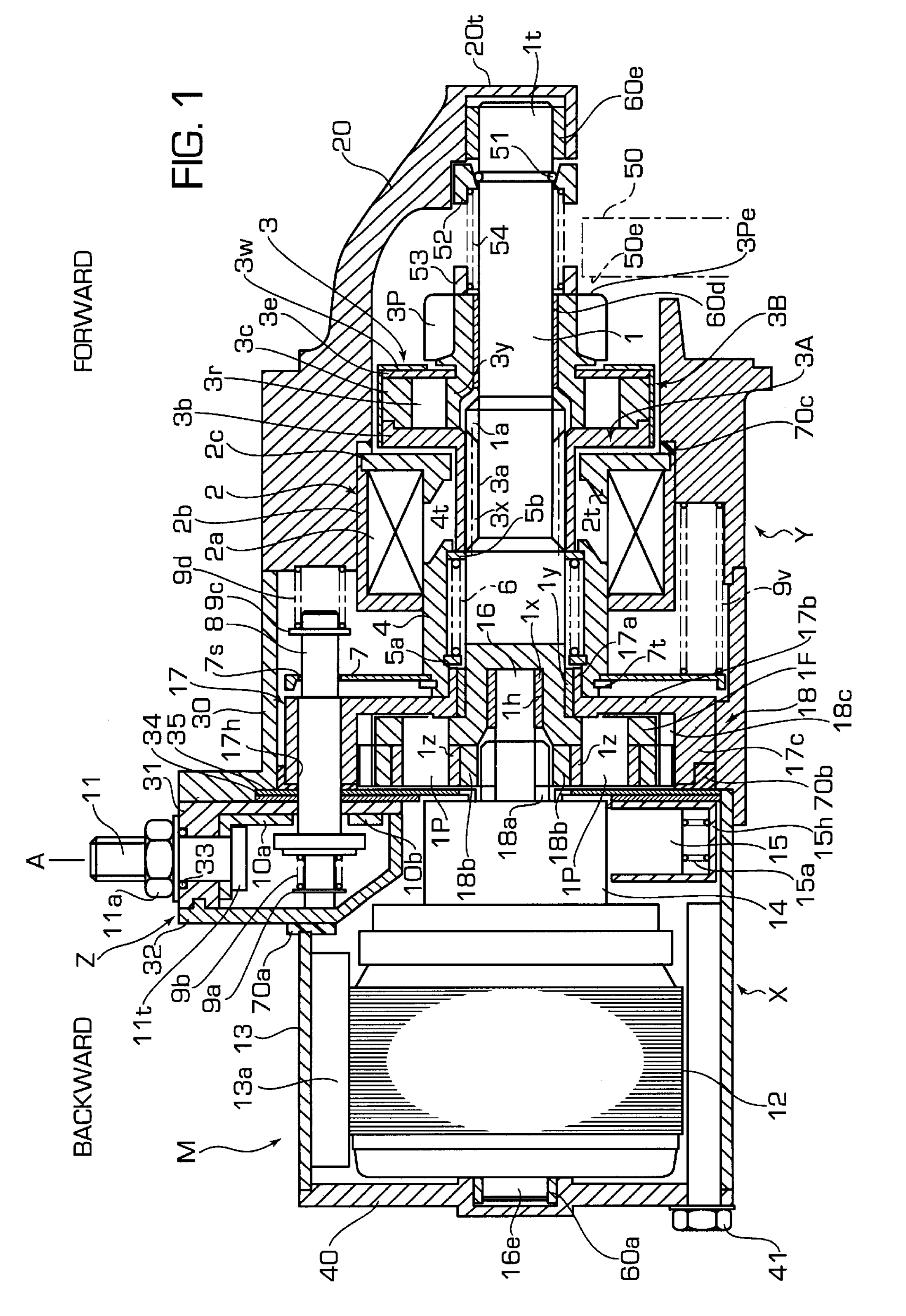
FIG. 1 is a sectional view showing the structure of a starter according to a first embodiment of the present invention.

FIG. 1 is a sectional view showing the structure of a starter according to the first embodiment. In FIG. 1, the left side portion is a DC motor portion X, the right side portion is an operating portion Y and the substantially central upper side portion is a contact chamber Z. Further, the electric motor side in FIG. 1 is referred to as the rear and the ring gear side is referred to as the front in the following explanation.

The starter in the first embodiment is covered with such outer wall members as a front bracket 20, a center bracket 30 and a rear bracket 40, and presents a substantially bullet-shaped external appearance. Further, a portion where a ring gear 50 enters forms an opening.

In the starter, there are arranged a DC motor M and an output shaft 1 that is driven by this DC motor M, and around the output shaft 1, a ring-shaped electromagnetic switch 2, an over-running clutch 3 and a plunger (a movable core) 4 are arranged.

In other words, the starter according to the first embodiment is a coaxial type starter with the electromagnetic switch 2, the over-running clutch 3 and the plunger 4 arranged on the same axle as the output shaft 1.

As is well known, the DC motor M comprises an armature 12, a yoke 13 that covers this armature 12, a stationary magnetic pole 13*a* provided inside this yoke 13, a commutator 14, brushes 15 and a shaft 16. The armature 12 is an armature core with an armature coil wound around it. The front side of the shaft 16 penetrates the cylindrical space of the cylindrical commutator 14 and is connected to a reduction mechanism 18.

The armature coil is connected to the commutator 14. The DC motor M is available in 2-pole, 4-pole and 6-pole types depending on the number of stationary magnetic poles. For instance, taking a case using a 6-pole DC motor as a sample, a total of 6 units of the stationary magnetic pole 13 are provided by arranging a N-pole and a S-pole alternately, and the brushes 15 kept in contact with the commutator 14 are arranged along the circumference of the commutator 14

Further, 15*a* is a spring that pushes the brush 15 against the commutator 14. 15*h* is a brush holder.

The output shaft 1 is driven by the DC motor M in the structure as described above.

The operating portion Y comprises the reduction mechanism 18, the output shaft 1, the electromagnetic switch 2, the over-running clutch 3, and the plunger 4.

17 is an inner gear member. This member comprises a first tubular portion 17*a* which is fitted to the outer circumference of the output shaft 1 via a bearing 1*y*, a tubular disk shape bottom plate portion 17*b* which extends in the direction perpendicular to the outer circumference of the output shaft 1 from the first tubular portion 17*a*, and a second tubular portion 17*c* that has an inner gear 18*c* on the inner circumference.

The reduction mechanism 18 comprises the inner gear 18*c* of the inner gear member 17, a sun gear 18*a* provided on the shaft 16, a plurality of planet gears 18*b* arranged around this sun gear 18*a* engaging with the sun gear 18*a* and the inner gear 18*c*, and a pin 1P that projects from a flange 1F of the output shaft 1 inserted between this group of planet gears 18*b* and a bottom plate 17*b* of the inner gear member 17 and connects each of the planet gears 18*b* to the flange 1F of the output shaft 1.

Further, the rotational force of each planet gear 18*b* is transmitted to each pin 1P via a bearing 1*z*.

Further, a round groove 1*h* is formed at the center of the flange 1F of the output shaft 1 and the forward end of the shaft 16 is supported rotatably via a bearing 1*x* provided in the round groove 1*h*.

Figure 9:
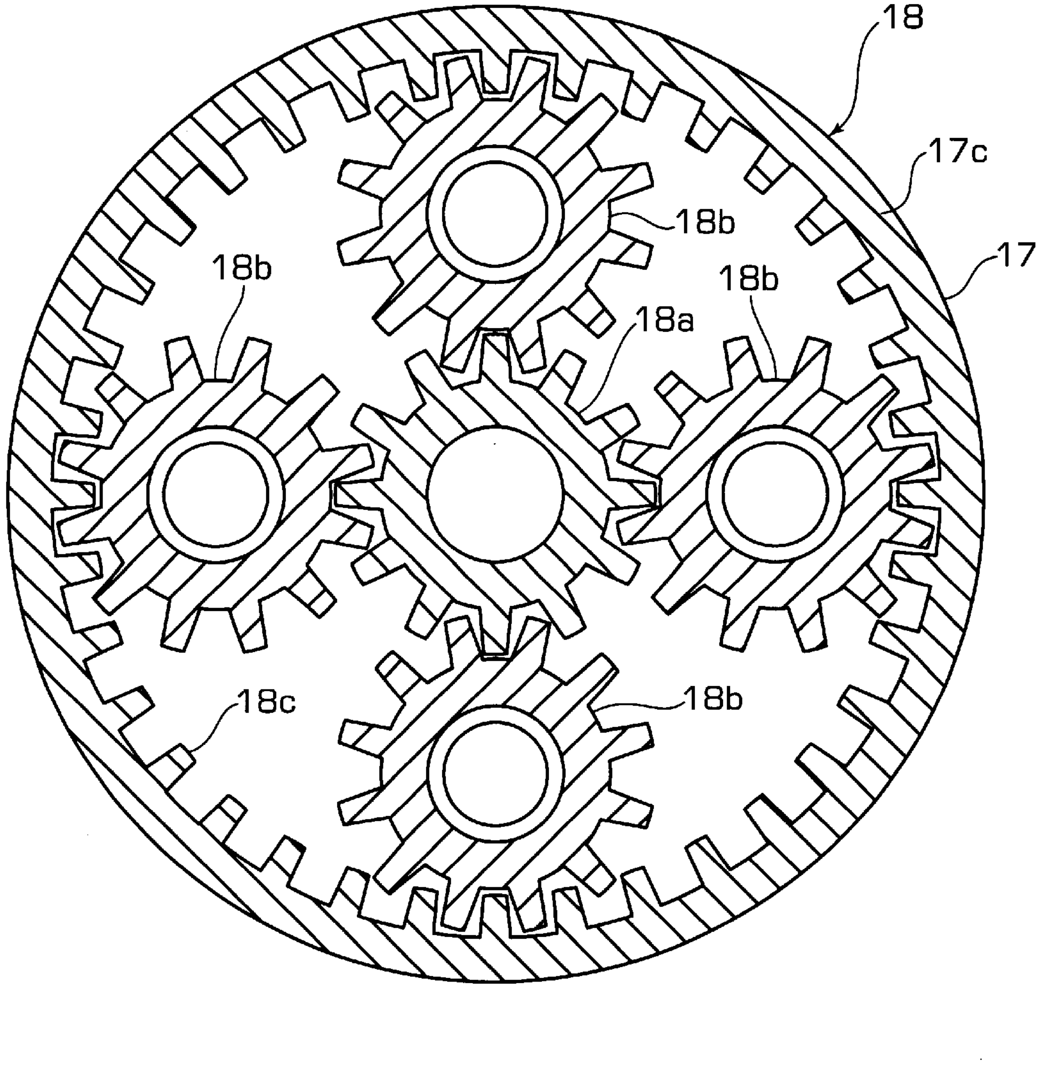
FIG. 9 is a sectional view of a reduction mechanism.

Accordingly, as shown in the sectional view in FIG. 9, when the planet gears 18*b* move round the sun gear 18*a*, the rotational force of the shaft 16 is reduced and transmitted to the output shaft 1 through the pins 1P.

Further, a helical spline 1*a* is formed on a part of the outer circumference at the central side of the output shaft 1. On the outer circumference of the part where this helical spline 1*a* is formed, the overrunning clutch 3 is arranged so that a tubular portion 3*a* of a thrust spline 3A corresponds thereto. Further, on the inner surface of the tubular portion 3*a* of the thrust spline 3A, a helical spline 3*x* is formed to mesh with the helical spline 1*a*. That is, the overrunning clutch 3 is spline connected to the output shaft 1.

Further, the electromagnetic switch 2 is arranged on the outer circumference side of the thrust spline 3A.

Further, the plunger 4 is arranged on the outer circumference at the flange 1F side of the output shaft 1.

The over-running clutch 3 comprises the thrust spline 3A that is formed of the tubular portion 3*a* having the helical spline 3*x* formed on its inner surface for meshing with the helical spline 1*a* that is formed on a part of outer circumference at the central side of said output shaft 1 and the flange portion 3*b* that is provided at the front side of this tubular portion 3*a* and becomes the cam bottom of a roller cam that is described later, a roller cam 3*a* interposed between the flange portion 3*b* of this thrust spline 3A and a washer 3*e*, a pinion 3P, a inner clutch 3*y* composed of a tubular portion at the base of the pinion 3P, a clutch roller 3*r* and a spring 3*s* that are arranged in a groove 3*t* formed on the roller cam 3*c*, and a clutch cover 3*w* that covers the outside of the flange portion 3*b* of the thrust spline 3A, the roller cam 3*c* and the washer 3*e*.

Further, said thrust spline 3A and the roller cam 3*c* form an outer clutch 3X.

Figure 10:
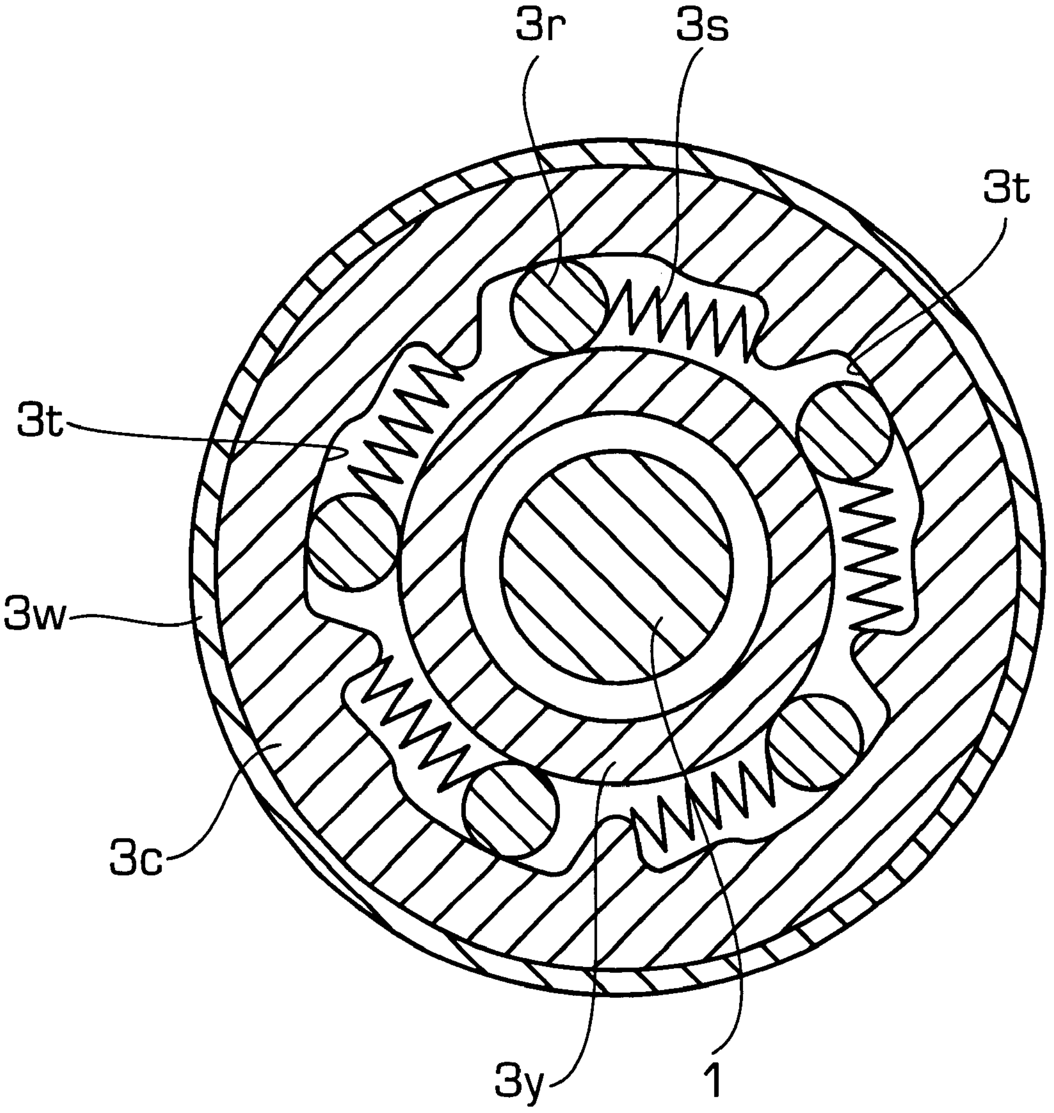
FIG. 10 is a sectional view of an over-running clutch.

Further, the over-running clutch 3 acts as a so-called one-way clutch. The sectional view of the over-running clutch is shown in FIG. 10. At several points on the inner circumference of the roller cam 3*c*, grooves 3*t* are provided to form a narrow space and a wide space between the outer circumference of the inner clutch 3*y*. The clutch roller 3*r* is arranged in each of these grooves 3*t*. 3*s* is a spring for pressing the clutch roller 3*t* toward the narrow space of the groove 3*t*.

When the output shaft 1 is driven by the DC motor M, the roller cam 3*c* is rotated, the clutch roller 3*r* moves to the narrow space of the groove 3*t*, the roller cam 3*c* of the clutch outer 3X meshes with the clutch inner 3*y*, and the pinion 3P turns and meshes with the ring gear 50. Then, when the pinion 3P is rotated together with the ring gear 50, the clutch roller 3*r* moves to the wide space of the groove 3*t*, the clutch outer 3X and the clutch inner 3*y* are disengaged and the over-running clutch 3 is separated from an engine.

The electromagnetic switch 2 comprises a switch case 2*b* for covering an exciting coil 2*a* and a core 2*c*, and is arranged at the rear side of the position of the one way clutch 3B. The core 2*c* has a hollow shaped disc surface opposing the flange portion 3*b* of said thrust spline 3A and is made in a ring shaped body arranged so as to penetrate the outer circumference of the tubular portion 3*a* of the thrust spline 3A. Also, the core has a ring shaped projecting portion 2*t* extends to the rear side at the tubular portion 3*a* side of the thrust spline 3A.

The plunger 4 is made of a tubular body that is arranged in a movable manner between the inner circumference of the switch case 2*b* and the tubular portion 3*a* of the thrust spline 3A. The front end side 4*t* opposing the ring shaped projecting portion 2*t* of the core 2*c* is formed in a shape corresponding to the shape of the ring shaped projecting portion 2*t*.

Further, on the inner circumference at the rear end side of the plunger 4, a ring shape plate 5*a* is secured as a first pressure plate. In addition, on the rear end side of the tubular portion 3*a* of the thrust spline 3A of the overrunning clutch 3, a ring shape plate 5*b* is provided as a second pressure plate. Between these plates 5*a*, 5*b*, that is, in the space between the inner circumference of the plunger 4 and the outer circumference of the output shaft 1, the coil spring 6 is arranged as an elastic means.

Accordingly, the plunger 4 is attracted by the core 2*c* and moves in the direction (forward) of the core 2*c* and the overrunning clutch 3 moves as pushed by the plate 5*b* with the movement of the plunger 4. When the pinion 3P once stops moving after the end surface 3Pe of the pinion 3P is brought into contact with the end surface 50*e* of the ring gear 50, and the motor is driven and the gear threads mesh with the grooves of the pinion 3P and the ring gear 50, the pinion 3P meshes with the ring gear 50 by the elastic force of the coil spring 6 that is compressed and accumulated up to this point.

8 is a contact shaft supported in a movable manner in the extended direction of the shaft by a supporting hole 17*h* provided on a part (the upper part of FIG.1) of a second tubular portion 17*c* of the inner gear member 17. Further, the contact shaft 8 is mounted so as to extend over the operating portion Y and the contact camber Z via the supporting hole 17*h*.

At one end side in the contact chamber Z of the contact shaft 8 a movable contact 8*e* is provided. Further, at the rear side from this movable contact 8*e*, a ring shape plate 9*a* is secured to the contact shaft 8. Between this plate 9*a* and the movable contact 8*e*, there is provided a coil spring 9*b* for pressing the movable contact 8*a* to the stationary contact side (later described). Further, at the other end of the shaft positioned at the operating portion Y side of the contact shaft 8, a ring shape plate 9*c* is secured to the contact shaft 8. Between this plate 9*c* and a front bracket 20, a return coil spring 9*d* is provided.

Further, a shift plate 7 is mounted on the rear end of the plunger 4. This shift plate 7 is a slender plate extending in the upper and lower directions with a hole formed at the center for mounting it on the rear end of the plunger 4 and a penetrating hole 7S at the upper portion corresponding to the contact shaft 8. This shift plate 7 is secured to the plunger 4 with an engaging ring 7*t*. Further, a return coil spring 9*v* is provided between the lower part of the shift plate 7 and the front bracket 20.

In addition, the shift plate 7 secured to the plunger 4 and the plate 9*c*, which is a plate contacting portion, form a contact shaft moving means.

The coil spring 6, the ring shape plate 5*a* as a first pressing plate, and the ring shape plate 5*b* as a second pressing plate form a means to provide a pressing force to the over-running clutch 3 in the direction of the ring gear.

33 is an O-ring and 70*b*, 70*c* are packing.

Further, a rear end 16*e* of the shaft 16 is supported rotatably on a rear bracket 40 via a bearing 60*a*. A front end 1*t* of the output shaft 1 is supported at an end 20*t* side of the front bracket 20 via a bearing 60*e*.

At the front side of the output shaft 1, a stopper 52 is provided via an engaging ring 51. Also, at the end of the pinion 3P, a stopper 53 is provided. Between these stoppers 52, 53, a return spring 54 is provided.

41 is a bolt to secure the motor portion X and the operating portion Y by interposing them between the rear bracket 40 and the front bracket 20.

The motor portion X, the contact chamber Z and the operating portion Y are divided by partition plates 34, 35.

Figure 11:
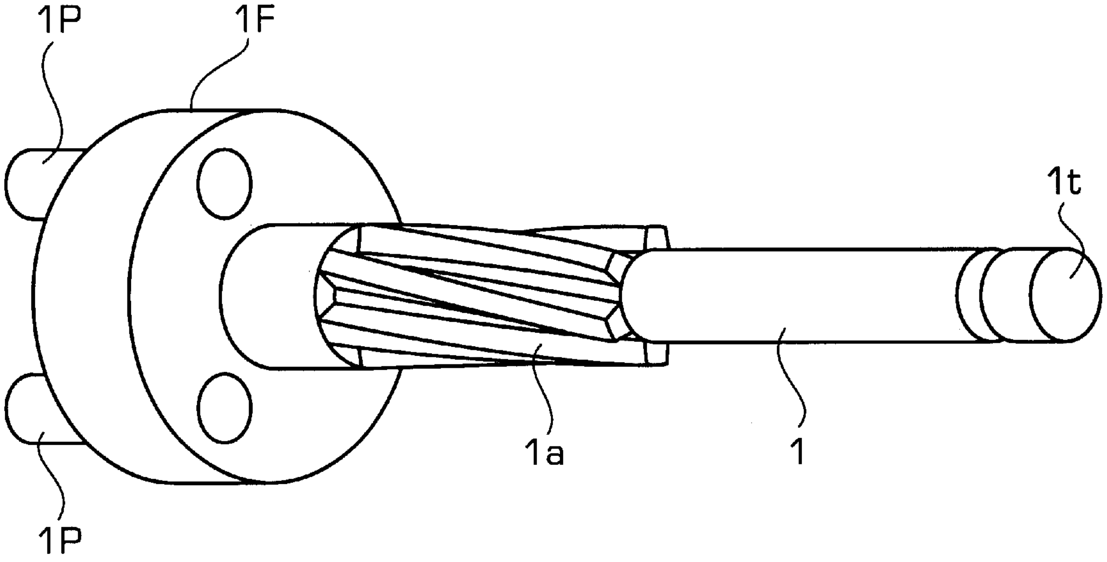
FIG. 11 is a perspective view of an output shaft.
Figure 12A:
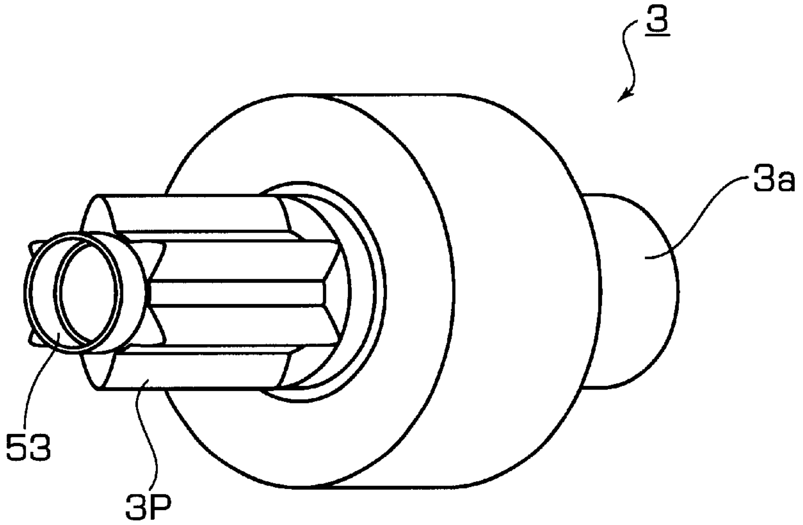
FIG. 12(*a*) FIG. 12(*b*) are perspective views of the over-running clutch.
Figure 12B:
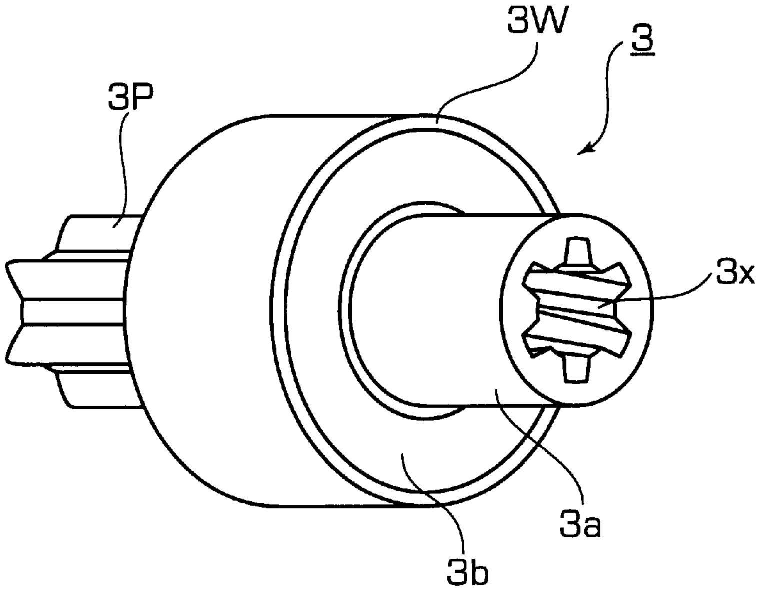
Figure 13:
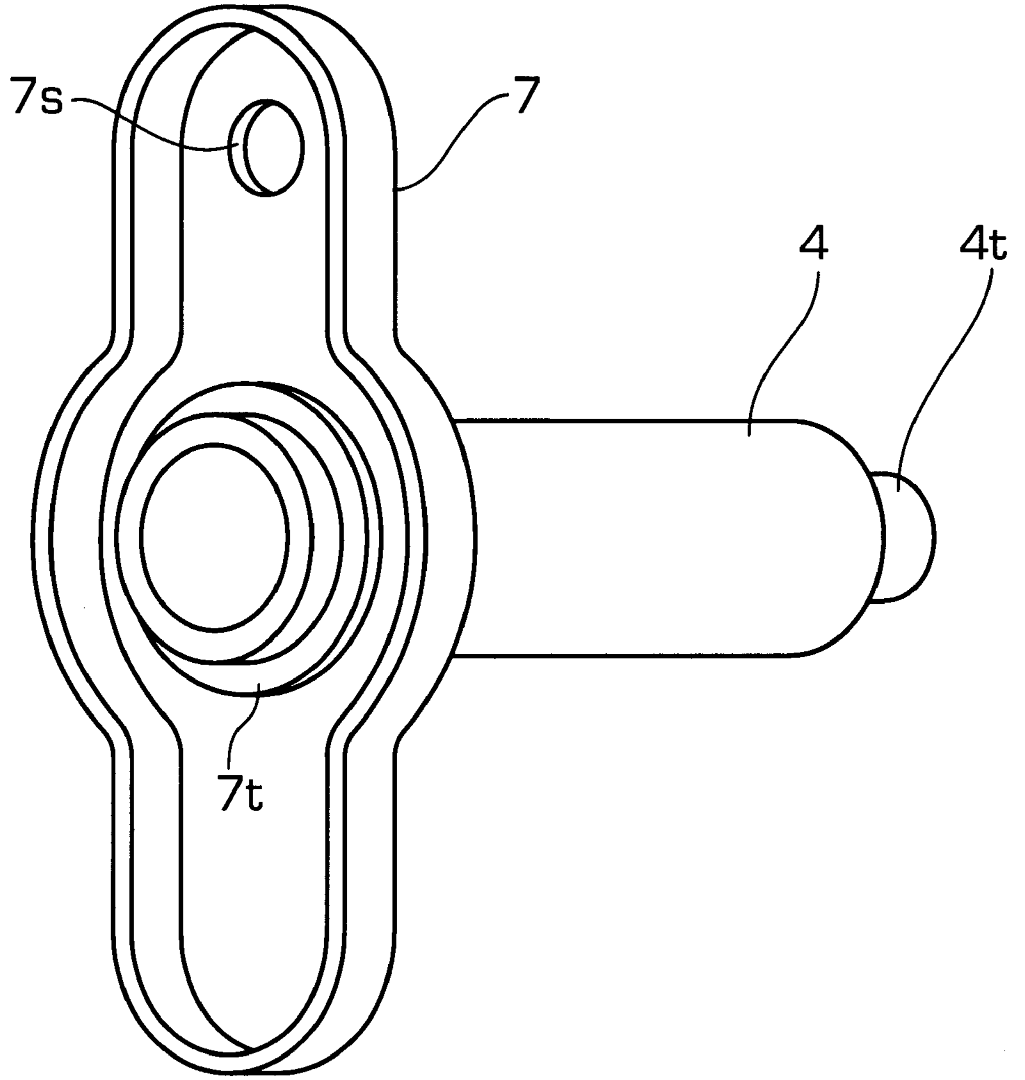
FIG. 13 is a perspective view of a plunger and a shift plate.
Figure 14:
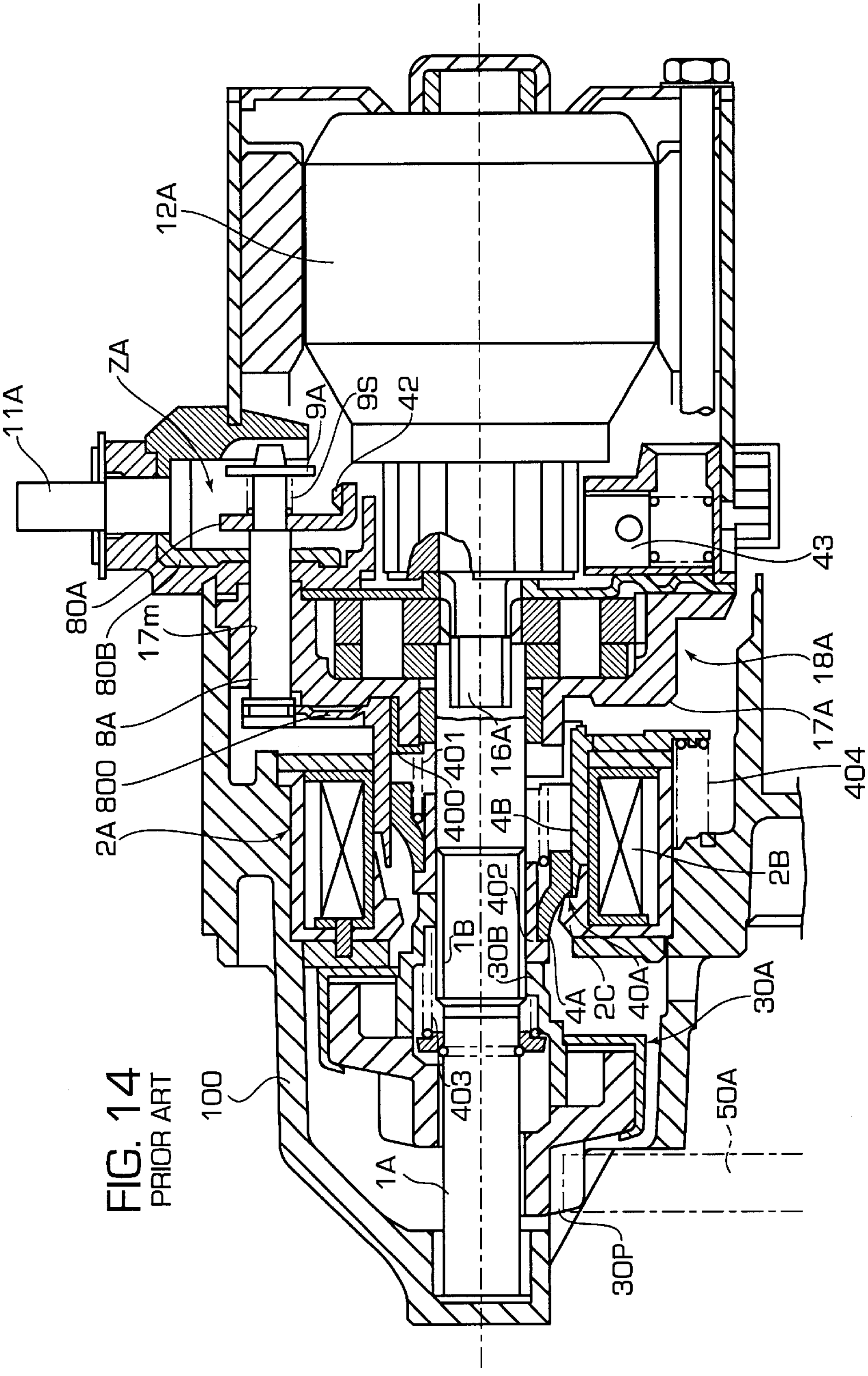
FIG. 14 PRIOR ART
FIG. 14 is a sectional view showing one example of a conventional starter.
Figure 15:
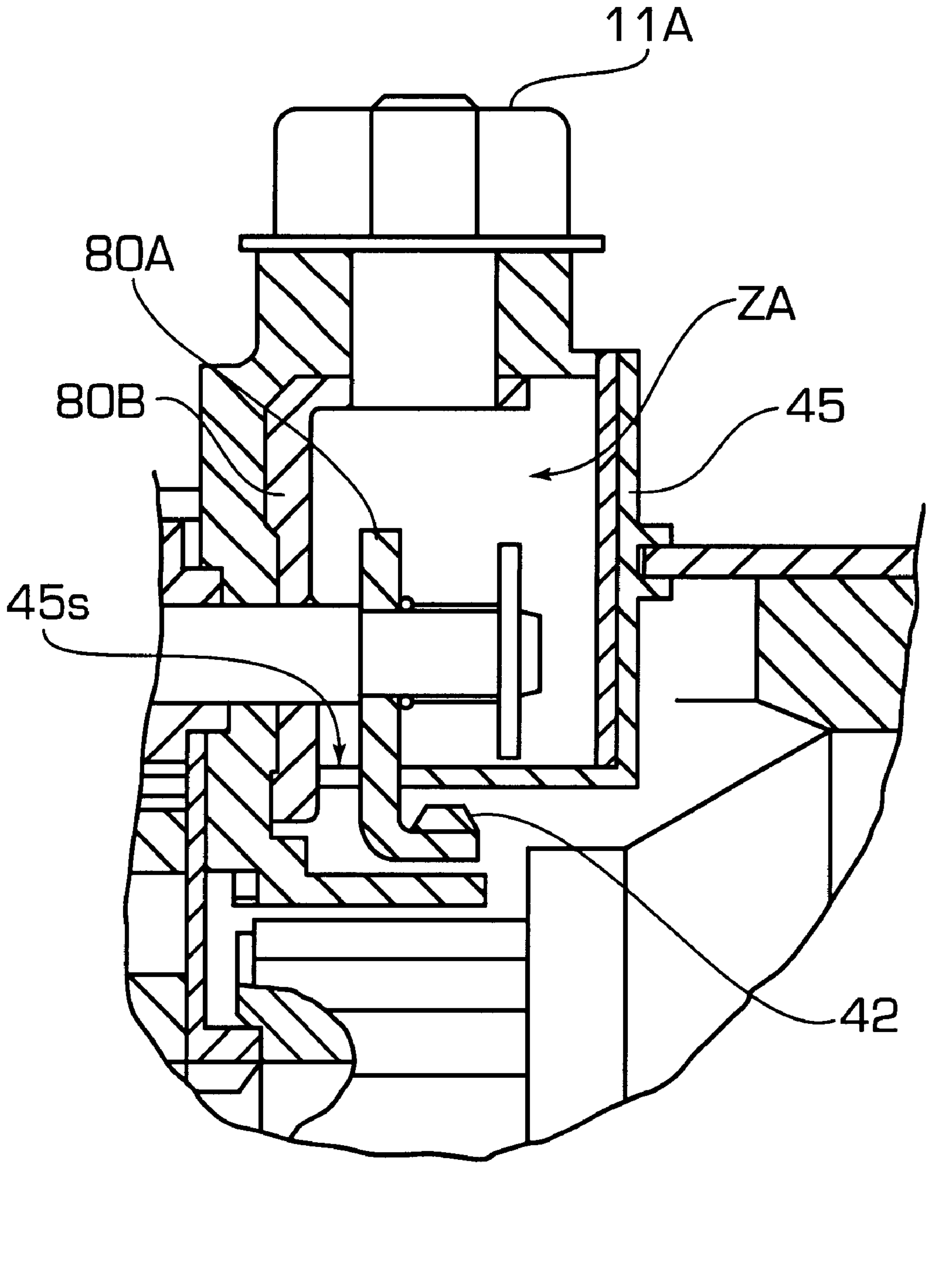
FIG. 15 PRIOR ART
FIG. 15 is a partial sectional view showing another example of a conventional starter.

FIG. 11 shows a perspective view of the output shaft 1, FIG. 12(*a*) and (*b*) show perspective views of the overrunning clutch 3 and FIG. 13 shows a perspective view of the plunger 4 and the shift plate 7.

Next, the structure of the contact chamber of the starter according to the present invention is described in detail.

Figure 2:
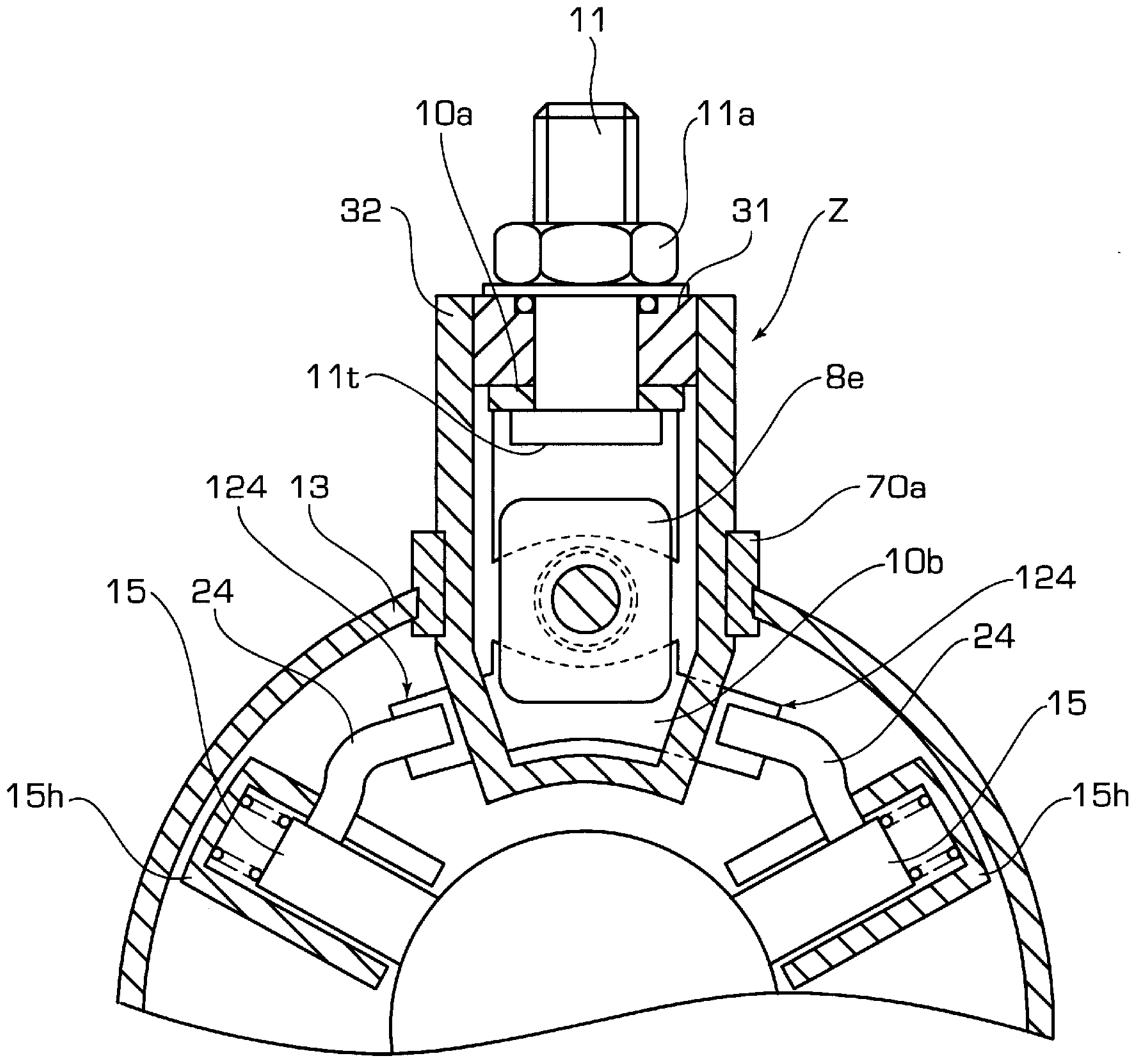
FIG. 2 is a sectional view for explaining the structure of a contact chamber of a starter according to the first embodiment.

FIG. 2 is an imaginary sectional view of the contact chamber showing its internal structure when viewed from the left (rear) side when it is cut at the section A shown in FIG. 1, and the connection with the brushes.

The contact chamber Z is arranged between a pair of positive pole brushes 15, 15. The contact chamber is divided into a contact bracket 31 and a contact chamber cover 32. A first stationary contact 10*a* and a second stationary contact 10*b* are provided on the contact bracket 31.

The first stationary contact 10*a* is connected to a battery via a terminal bolt 11.

The second stationary contact 10*b* is connected to the positive pole brushes 15, 15 via a pigtail 24 (a lead wire) and is also connected to the other end of the exciting coil 2*a* of the electromagnetic switch 2.

Further, as the terminal bolt 11 is secured with a nut 11*a*, the first stationary contact 10*a* is secured to the contact bracket 31 by a bolt head 11*t*.

Figure 4:
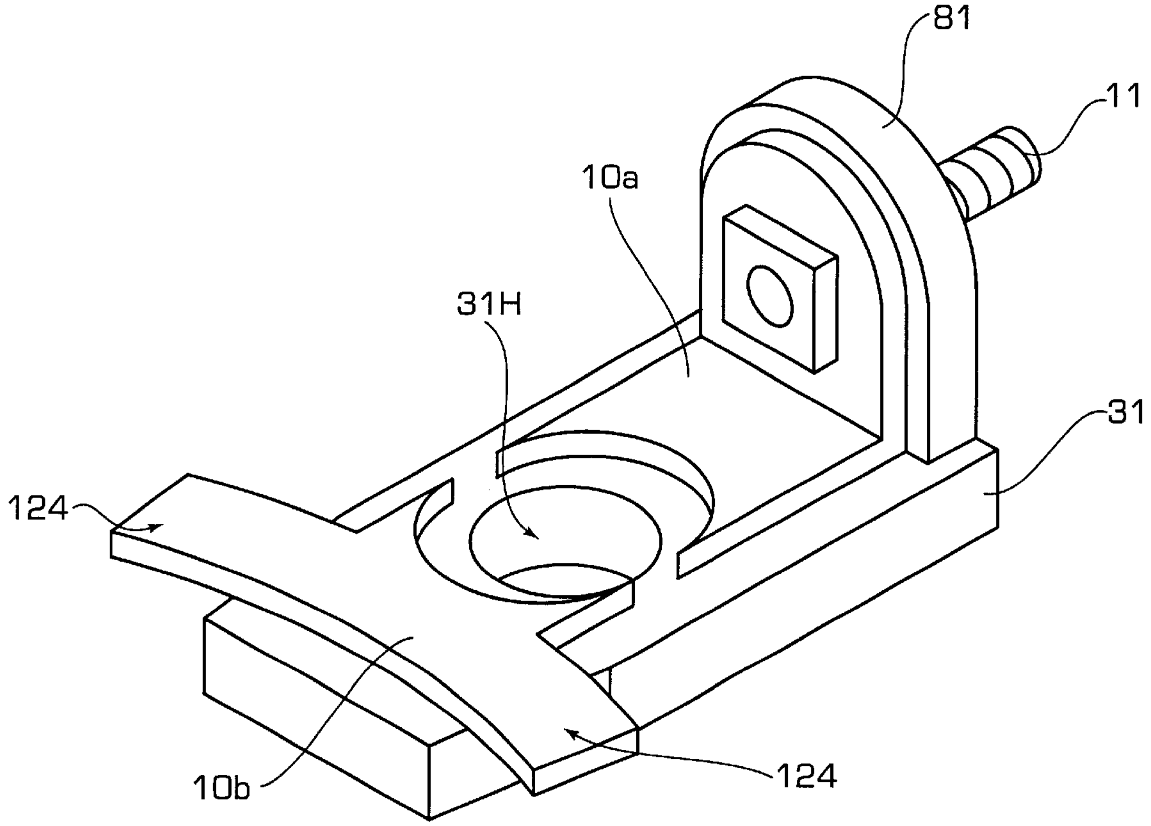
FIG. 4 is a perspective view showing a contact bracket and stationary contacts forming the contact chamber.
Figure 5:
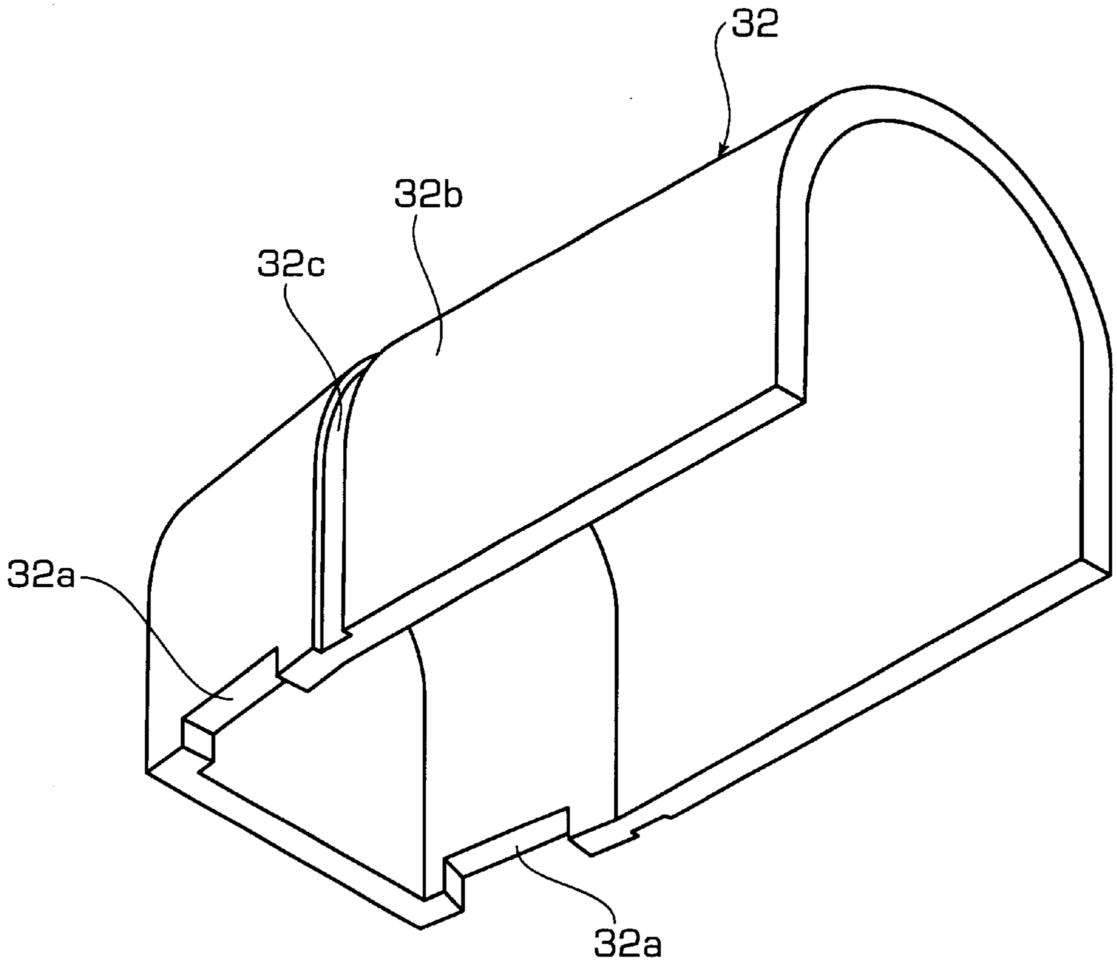
FIG. 5 is a perspective view showing a contact chamber cover forming the contact chamber.
Figure 6:
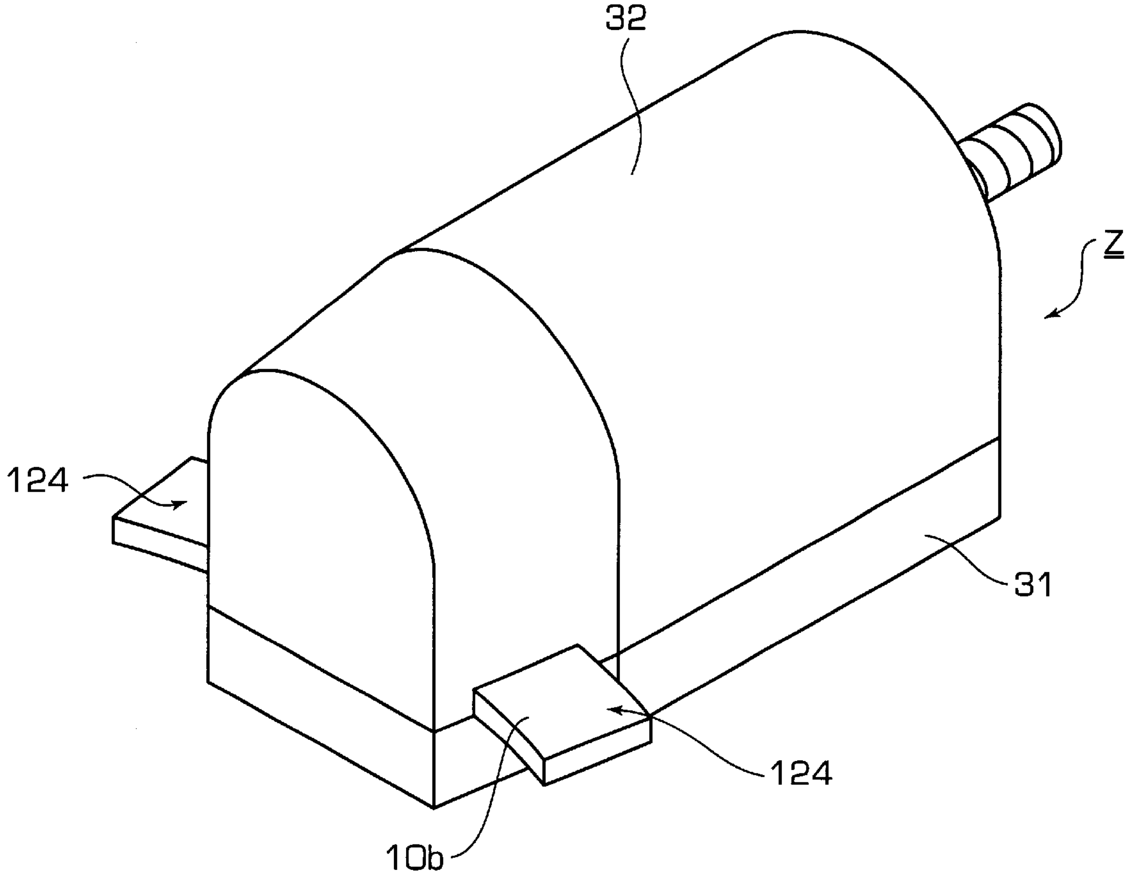
FIG. 6 is a perspective view of the exterior of the contact chamber.

FIG. 4 shows a perspective view of the inside of the contact chamber, FIG. 5 is a perspective view of the contact chamber cover, and FIG. 6 is an external perspective view of the contact chamber. As seen from these drawings, in order to lead a connecting portion 124 with the pigtail 24 at the second stationary contact 10*b* to the outside of the contact chamber Z under the airtight state of the contact chamber Z, a concave portion 32*a* is formed on the contact chamber cover 32 at the position corresponding to the second stationary contact 10*b*. As a result, as shown in FIG. 6, the contact chamber Z is maintained in an airtight state by interposing and holding the second stationary contact 10*b* between the contact chamber cover 32 and the contact bracket 31. Further, as shown in FIG. 4, a hole 31H is formed on the contact bracket 31 to allow the contact shaft to pass through it and the first and the second stationary contacts 10*a*, 10*b* are provided avoiding this hole 31.

Figure 3:
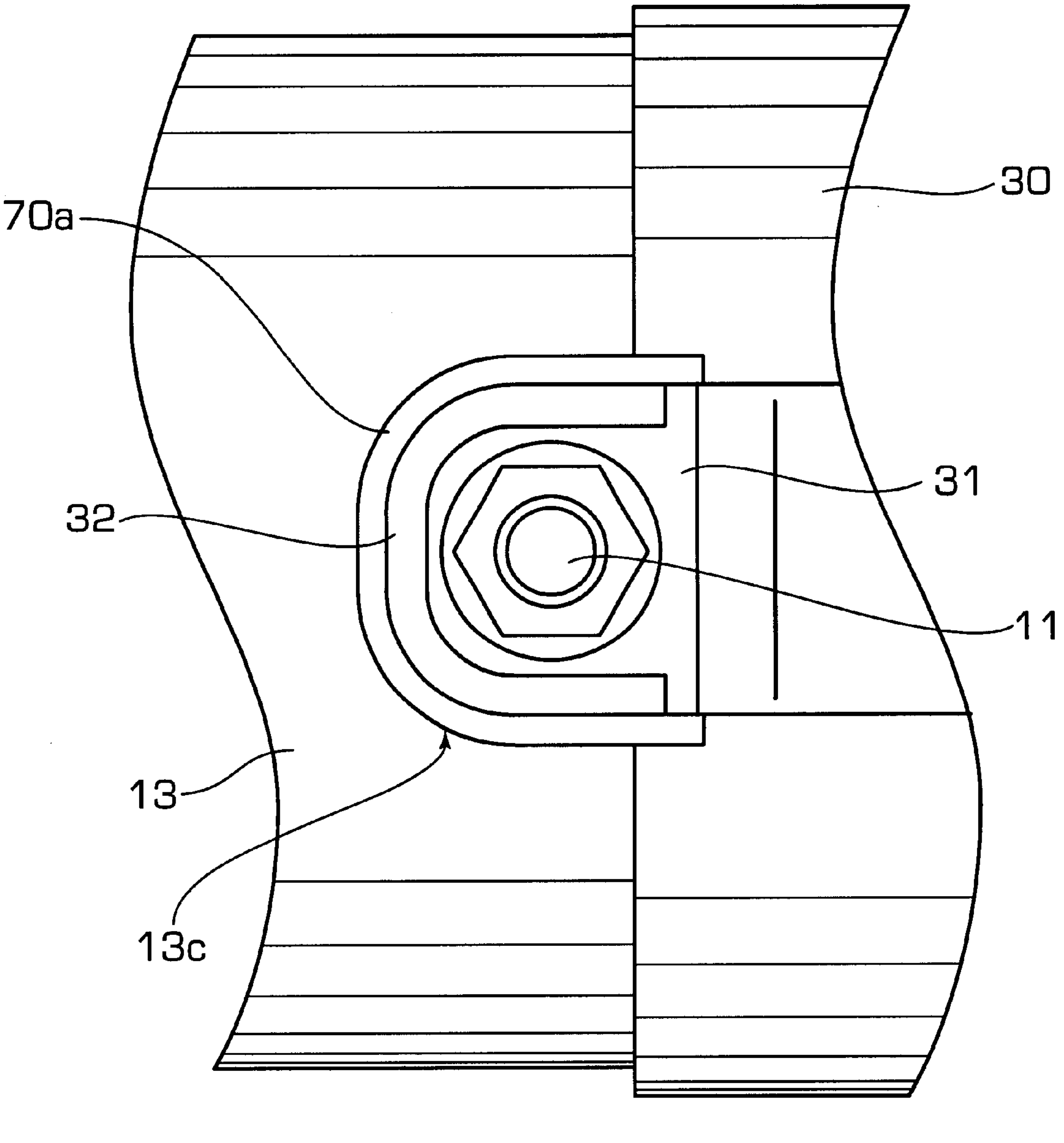
FIG. 3 is a top view when viewed from the direction A in FIG. 1.

As shown in FIG. 1 and FIG. 3 viewed from the direction A in FIG. 1, a U-shaped concave portion 13*c* is provided on the motor yoke 13 corresponding to the shape of the back surface 32*b* of the contact chamber cover 32, a grommet 70*a* made of rubber is set in this concave portion as a buffer material, and by way of this grommet 70*a*, the contact chamber cover 32 is pressed down toward the contact bracket 31 by the yoke 13. Further, a concave portion 32*c* is also formed on the back 32*b* of the contact chamber cover 32 to fit the grommet 70*a* therein.

Next, the operation will be described.

When the ignition switch is turned ON and current flows to the exciting coil 2*a* of the electromagnetic switch 2, the plunger 4 is attracted toward the exciting core 2*c*, the plate 5*a* pushes the coil spring 6, the plate 5*b* presses the thrust spline 3A, and the overrunning clutch 3 is pushed out toward the ring gear 50. As a result, the end surface 3P*e* of the pinion 3P provided at the over-running clutch 3 is brought into contact with the end surface 50*e* of the ring gear 50 and the over-running clutch 3 initially stops to move in the forward direction (the right direction in FIG. 1). However, while the plate 5*a* provided at the inner circumference side of the plunger 4 presses the coil spring 6, the plunger 4 is further attracted and moves continuously and the shift plate 7 also moves forward and contacts the plate 9*c*.

As the plunger 4 is attracted continuously following this state, the plate 9*c* secured to the contact shaft 8 is pushed by the shift plate 7 and the contact shaft 8 also moves forward. Then, when the movable contact 8*e* of the contact shaft 8 is brought into contact with the first and the second stationary contacts 10*a*, 10*b*, electric power is supplied from a battery and the armature 12 begins to turn.

Further, the contact shaft 8 moves continuously until the plunger 4 is completely attracted and its end 4*t* side is brought into contact with the exciting core 2*c*. At this time, the coil spring 9*b* is compressed by the plate 9*a* and thus, the movable contact 8*e* is depressed and kept in contact with the first and the second stationary contacts 10*a*, 10*b*.

When the armature 12 begins to turn, its rotational force is decelerated through the reduction mechanism 18 and is transmitted to the output shaft 1, the overrunning clutch 3 that is spline-connected to the output shaft 1, and further, to the pinion 3P. Then, when the pinion 3P turns slowly and the threads and grooves of the pinion 3P agree with those of the ring gear, the pinion 3P is pushed forward by the spring force (the elastic force) of the pressed coil spring 6 and completely meshes with the ring gear 50. Thus, as the crankshaft connected to the ring gear turns, the engine is started.

When the engine is started, the output shaft 1 and the pinion 3P are separated by the action of the overrunning clutch 3 and the pinion 3P runs idle. Then, when the power supply to the exciting coil 2*a* is stopped, the pinion 3P is disengaged from the ring gear 50 as the plunger 4 and the overrunning clutch 3 are returned to their original positions by the return coil springs 9*d*, 9*v*.

Further, when the gear threads and grooves of the pinion 3P agree with those of the ring gear 50, they mesh because the end surface 3P*e* of the pinion 3P does not contact the end surface 50*e* of the ring gear 50 and there is no problem.

According to the first embodiment, the motor has such a structure that the pigtail 24 is connected to the second stationary contact 10*b* for the electrical connection to the positive pole brushes 15, no repetitive stress is applied to the pigtail 24 and the contact chamber z is maintained in an airtight state by interposing and holding the second stationary contact 10*b* between the contact chamber cover 32 and the contact bracket 31. In other words, the contact chamber cover 32 is provided to keep the contact chamber Z in an airtight state and therefore, it is possible to almost completely prevent powder from the brushes from entering the contact chamber Z. Accordingly, it is possible to obtain a highly reliable starter that is capable of preventing improper contact of the contacts 10*a* and 10*b* in the structure where no repetitive stress is applied to the pigtail 24.

Further, the motor is made with such a structure that the contact chamber cover 32 is depressed by the yoke 13 via the grommet 70*a* in the direction of the contact bracket 31. The contacting force between the contact chamber cover 32 and the contact bracket 31 can be made strong and a highly airtight contact chamber Z is obtained. It is therefore possible to obtain a highly waterproofed starter preventing water from entering the inside of the motor such as the contact chamber Z and the motor portion X as a result of the structure of the concave portions 32*c*, 13*c* formed on the contact chamber cover 32 and the yoke 13 and the grommet 70*a* interposed between these concave portions.

In addition, according to the first embodiment, the concave portion 32*a* corresponding to the second stationary contact 10*b* is provided on the contact chamber cover 32 but may be provided on the contact bracket 31. In this case, the second stationary contact must be provided with a connecting portion 124 having the pigtail 24 formed in a shape to fit into the concave portion provided on the contact bracket 31.

Further, when the second stationary contact 10*b* is secured to the contact bracket 31 by riveting, etc., the play of the second stationary contact 10*b* is eliminated and a more highly reliable starter is obtained.

Second Embodiment

Figure 7:
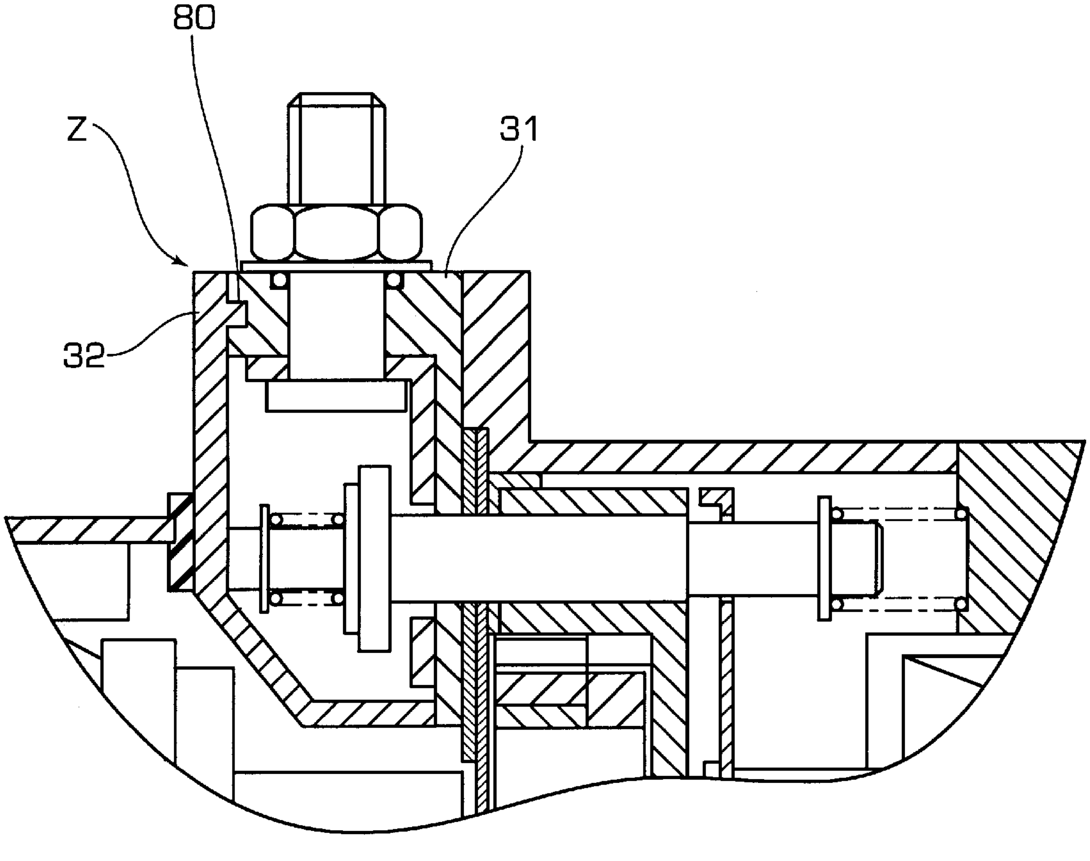
FIG. 7 is a sectional view for explaining the structure of the contact chamber of a starter according to a second embodiment.
Figure 8:
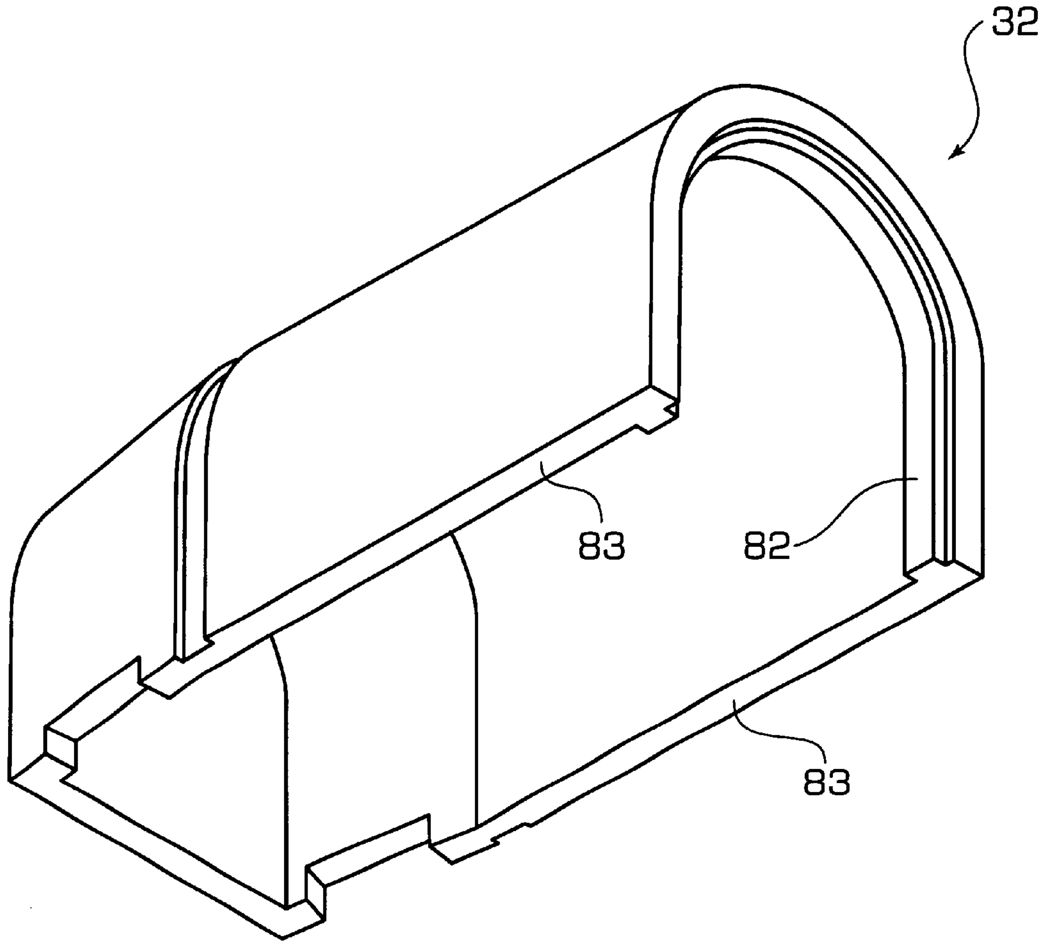
FIG. 8 is a perspective view showing a contact chamber cover forming the contact chamber according to the second embodiment 2.

As shown in FIG. 7 and FIG. 8, a pair of concavo-convex portions 80 are provided on the contacting surface between the portion of the contact bracket 31 on which the contact bolt 11 is mounted and the contact chamber cover 32. The contact bracket 31 and the contact chamber cover 32 are press fitted by these concavo-convex portions. Specifically, a concave portion is provided along the circumferential surface 81 at the portion of the contact bracket 31 shown in FIG.4, on which the contact bolt 11 is mounted, and a convex portion 82 shown in FIG. 8 is formed on the contact chamber cover so as to correspond to the concave portion.

Thus, a starter having a more higher water-proof performance is obtained.

Further, a sealing material or a packing may be provided between the concave and convex parts of the concavo-convex portion 80.

In addition to the structure of the second embodiment, a pair of concavo-convex portions may be provided on the contacting surfaces 83 (see FIG. 8) of the contact bracket 31 on which the second stationary contact 10*b* is mounted, with the contact chamber cover 32 contacting to the contact bracket 31 to further improve the water-proof performance and the airtightness of the contact chamber Z.

The various springs used in the invention may be made of rubber. In short, elastic means capable of conserving elastic force are acceptable.

Further, in the starter in the above embodiments, the contact shaft 8 is supported by the supporting hole 17*h* provided on the inner gear member 17. However, in such structure, a supporting portion with a supporting hole formed for supporting the contact shaft 8 may be provided on a center bracket 30, which is an outer wall member, and the contact shaft 8 may be supported by the center bracket 30.

As described above, according to the present invention, it is possible to obtain a highly reliable starter of such a structure that a contact bracket is provided to hold a first stationary contact, and a contact chamber cover is provided to interpose and hold a second stationary contact between the contact chamber cover and the contact bracket so that the contact chamber can be kept in an airtight state, preventing powder from brushes entering the contact chamber and also preventing improper contact.

Further, a pair of concavo-convex portions are formed on the contact chamber cover and the contact bracket to lead the second stationary contact to the outside of the contact chamber in an airtight state of the contact chamber. Therefore, this effect can be achieved more specifically.

Further, the contact chamber cover is pressed via the buffer material in the direction of the contact bracket by the yoke. Therefore, in addition to the above-mentioned effect, a more airtight contact chamber is obtained and a more water-proof starter capable of preventing entry of water into the inside of the contact chamber and the motor portion is provided.

Further, since a pair of concave-convex portions are provided on the contacting surface between the contact bracket and the contact chamber cover so that the contact bracket and contact chamber cover can be secured by engaging these concave-convex portions, it is possible to improve the airtight performance of the contact chamber.

What is claimed is:

1. A starter comprising:

an output shaft driven by an electric motor;

a plunger;

an exciting coil for attracting the plunger;

an over-running clutch having a pinion adapted to mesh with a ring gear and spline-connected to the output shaft;

said plunger, exciting coil and over-running clutch being arranged on the outer circumference of and on the same axis as the output shaft;

a contact shaft provided at one end thereof with a movable contact for contacting stationary contacts to supply the motor with electric power and disposed substantially in parallel with the plunger;

said stationary contacts comprising a first stationary contact electrically connected to a battery and a second stationary contact electrically connected to positive pole brushes;

a contact chamber where the electricity is sent between the first stationary contact and the second stationary contact by the movable contact;

and wherein a contact bracket is provided to hold the first stationary contact, and a contact chamber cover is provided to interpose and hold the second stationary contact between the contact chamber cover and the contact bracket, thereby keeping the contact chamber in an airtight state.

2. A starter according to claim 1, wherein a pair of concavo-convex portions are formed on the contact chamber cover and the contact bracket in order to lead the second stationary contact to the outside of the contact chamber in an airtight state of the contact chamber.

3. A starter according to claim 1, wherein the contact chamber cover is depressed via a buffer material in the direction of the contact bracket by a yoke of the motor.

4. A starter according to claim 1, wherein a pair of concavo-convex portions are provided on the contacting surfaces between the contact bracket and the contact chamber cover, and the contact bracket and the contact chamber cover are secured by engaging the concavo-convex portions.

* * * * *